US009146132B2

(12) United States Patent
He

(10) Patent No.: US 9,146,132 B2
(45) Date of Patent: Sep. 29, 2015

(54) SYSTEMS AND METHODS FOR DISPLAYING IMAGES OF TERRAIN DATA

(75) Inventor: Gang He, Morristown, NJ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 2040 days.

(21) Appl. No.: 12/240,486

(22) Filed: Sep. 29, 2008

(65) Prior Publication Data

US 2010/0283782 A1    Nov. 11, 2010

(51) Int. Cl.
*G06T 17/00*    (2006.01)
*G01C 23/00*    (2006.01)
*G06T 17/05*    (2011.01)
*G08G 5/00*    (2006.01)

(52) U.S. Cl.
CPC .............. *G01C 23/00* (2013.01); *G06T 17/05* (2013.01); *G08G 5/0021* (2013.01)

(58) Field of Classification Search
CPC .............................. G01C 23/00; G08G 5/0021
USPC .................................................. 345/632, 633
See application file for complete search history.

(56) References Cited

U.S. PATENT DOCUMENTS

| | | | |
|---|---|---|---|
| 7,580,776 B1* | 8/2009 | McCusker et al. ................ 701/3 |
| 2005/0232512 A1 | 10/2005 | Luk et al. | |
| 2007/0005199 A1* | 1/2007 | He .................................. 701/16 |
| 2007/0171094 A1 | 7/2007 | Alter et al. | |
| 2008/0158256 A1* | 7/2008 | Russell et al. ................ 345/629 |
| 2013/0106832 A1* | 5/2013 | Meeker et al. ................ 345/419 |

FOREIGN PATENT DOCUMENTS

WO    WO-2008/065119 A1 *   6/2008

OTHER PUBLICATIONS

EP Search Report dated Dec. 23, 2009, EP 09166159.5-1236.

* cited by examiner

*Primary Examiner* — Jeffery A Brier
(74) *Attorney, Agent, or Firm* — Ingrassia Fisher & Lorenz, P.C.

(57) ABSTRACT

A display system for a vehicle includes a sensor system configured to collect first terrain data; a database configured to store second terrain data; a processing unit coupled to the sensor system and database, the processing unit configured to receive the first and second terrain data, to integrate the first and second terrain data into a common three-dimensional view that comprises symbology representing both the first and second terrain data, and to supply display commands associated with the first and second terrain data; and a display device coupled the processing unit and configured to receive the display commands and operable to render the common three-dimensional view to thereby allow simultaneous viewing of the first and second terrain data.

18 Claims, 3 Drawing Sheets

SYSTEMS AND METHODS FOR DISPLAYING IMAGES OF TERRAIN DATA

STATEMENT REGARDING FEDERALLY SPONSORED RESEARCH OR DEVELOPMENT

This invention was made with U.S. Government support under Agreement No. W31P4Q-07-C-0182 awarded pursuant to the DARPA/Sandblaster Program. The U.S. Government may have certain rights in this invention.

TECHNICAL FIELD

The present invention generally relates to aircraft display systems and methods and, more particularly, to systems and methods that display images representing terrain data integrated from database and sensor sources.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays to display important flight management, navigation, and control information to flight crews. For example, the Primary Flight Display can combine critical flight instrumentation (e.g., altitude, attitude, heading, airspeed, vertical speed instruments) and primary engine instrument indicators into a single, readily interpretable display.

Some Primary Flight Displays may provide a 3D, synthetic perspective view of the terrain surrounding the aircraft, including man-made and natural terrain. These images are typically based on pre-loaded and predetermined terrain data from a database. In some situations, the terrain data from the database may need to be updated over time, particularly when the terrain data relates to man-made obstacles such as buildings and movable vehicles.

Accordingly, it is desirable to provide systems and methods that increase the accuracy of terrain data displayed on a visual display, such as, for example, a Primary Flight Display, similar electronic aircraft displays, and other types of electronic displays. Particularly, it is desirable to provide systems and methods that display images of the terrain based on integrated data from both database and sensor sources. Furthermore, other desirable features and characteristics of the present invention will become apparent from the subsequent detailed description of the invention and the appended claims, taken in conjunction with the accompanying drawings and this background of the invention.

BRIEF SUMMARY

In an exemplary embodiment, a display system for a vehicle is provided. The display system includes a sensor system configured to collect first terrain data; a database configured to store second terrain data; a processing unit coupled to the sensor system and database, the processing unit configured to receive the first and second terrain data, to integrate the first and second terrain data into a common three-dimensional view that comprises symbology representing both the first and second terrain data, and to supply display commands associated with the first and second terrain data; and a display device coupled the processing unit and configured to receive the display commands and operable to render the common three-dimensional view to thereby allow simultaneous viewing of the first and second terrain data.

In another exemplary embodiment, a method is provided for displaying first terrain data from a sensor system and second terrain data from a database. The method includes receiving the first terrain data from the sensor system; receiving the second terrain data from the database; evaluating an integrity of the first and second terrain data; prioritizing the first and second terrain data based on the integrity evaluation to create a prioritized result; blending the first and second terrain data based on the prioritized result to create blended first and second terrain data; and producing display signals based on the blended first and second terrain data.

In yet another exemplary embodiment, a Primary Flight Display system for an aircraft is provided. The Primary Flight Display includes a sensor system configured to collect first terrain data; a database configured to store second terrain data; a processing unit coupled to the sensor system and database, the processing unit configured to receive, blend, evaluate, and prioritize the first and second terrain data into a common three-dimensional view that comprises symbology representing both the first and second terrain data, and to supply display commands associated with the first and second terrain data; and a display device coupled the processing unit and configured to receive the display commands and operable to render the common three-dimensional view to thereby allow simultaneous viewing of the first and second terrain data, including symbology representing the first terrain data in a first color and the second terrain data in a second color.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods that display images of terrain data integrated form both database and sensor sources.

Figure 1:
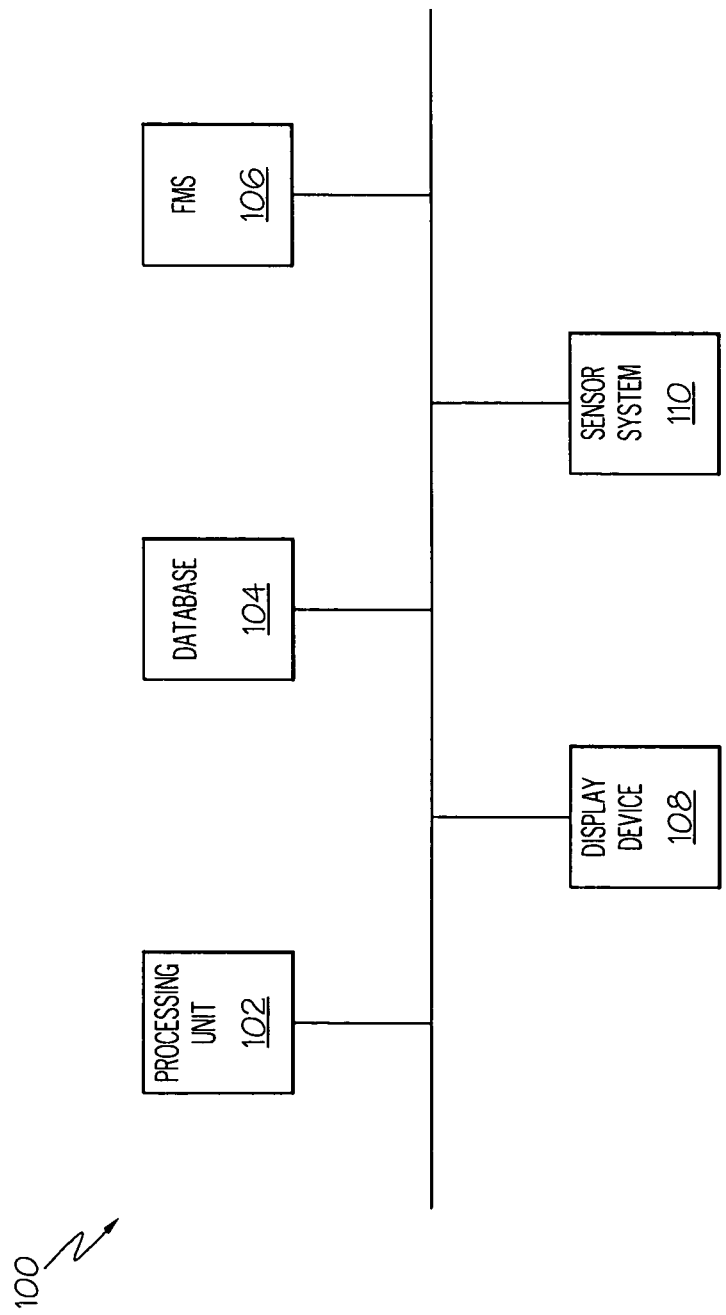
FIG. 1 is a functional block diagram of an aircraft display system according to an exemplary embodiment.

FIG. 1 depicts a block diagram of an exemplary aircraft visual display system 100 for displaying images representing integrated database and sensor data. In the exemplary embodiment shown, the system 100 includes a processing unit 102, a database 104, a flight management system 106, a display device 108, and sensor system 110. Although the system 100 appears in FIG. 1 to be arranged as an integrated system, the system 100 is not so limited and can also include an arrangement whereby one or more of the processing unit 102, the database 104, the flight management system 106, the display device 108, and the sensor system 110 are separate components or subcomponents of another system located either onboard or external to an aircraft. Also, for example, the system 100 can be arranged as an integrated system (e.g., aircraft display system, Primary Flight Display system, a Head Up Display with SVS or EVS as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a Primary Flight Display. Generally, the processing unit 102 receives and/or retrieves flight management information (e.g., from the flight management system 106) and landing, target and/or terrain information (e.g., from database 104 or sensor system 110). The processing unit 102 generates display control signals for a visual display of the flight management information, which includes navigation and control symbology such as a zero pitch reference line, heading indicators, tapes for airspeed and altitude, flight path information, RNP information, and any other information desired by a flight crew. As discussed in further detail below, the processing unit 102 additionally receives and integrates terrain data from the database 104 and sensor system 110, and generates display control signals based on the integrated terrain data. The processing unit 102 then sends the generated display control signals to a display device (e.g., the display device 108). More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing, waypoint, and target location as either absolute coordinate data or as a function of an aircraft's position. Database 104 can additionally include other types of navigation information, such as information used to calculate flight path and determine RNP information. Database 104 can also include, for example, a terrain database, which includes the locations and elevations of natural and man-made terrain. The terrain can include obstacles, such as buildings and vehicles. Obstacle data can be stored together with terrain database or in a separated obstacle only database. The geographic locations and height of the obstacles for typical avionics applications can be obtained through survey or through various reporting services.

The sensor system 110 is coupled to the processing unit 102 and can include any suitable sensor for detecting terrain and providing data to the processing unit 102 based on the detected terrain. The sensor system 110 can include sensors such as radar or forward-looking infrared (FLIR). Other types of imaging sensors may include types such as visible light, millimeter-wave radar, X-band (weather) radar, etc. In one embodiment, the sensor system 110 is a stand-alone system, although in other embodiments, the sensor system 110 can be used to completely or partially verify database 104. The sensor collected data, after additional verifications, may be later inserted into the database 104 for future uses.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., pitch, airspeed, altitude, attitude, etc.). Such information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and information representing at least pitch, heading, flight path, airspeed, altitude, landing information, waypoints, targets, obstacle, terrain, and RNP data in an integrated, multi-color or monochrome form. Using data retrieved (or received) from the flight management system 106, the processing unit 102 executes one or more algorithms (e.g., implemented in software) for determining the position of the various types of desired information on the display device 108. The processing unit 102 then generates a plurality of display control signals representing this data, and sends display control signals to the display device 108. The display device 108 and/or processing unit 102 may include a graphics display generator for generating the appropriate symbology on the screen of the display device 108, as discussed in greater detail below. In this embodiment, the display device 108 is an aircraft cockpit, multi-color display (e.g., a Primary Flight Display).

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
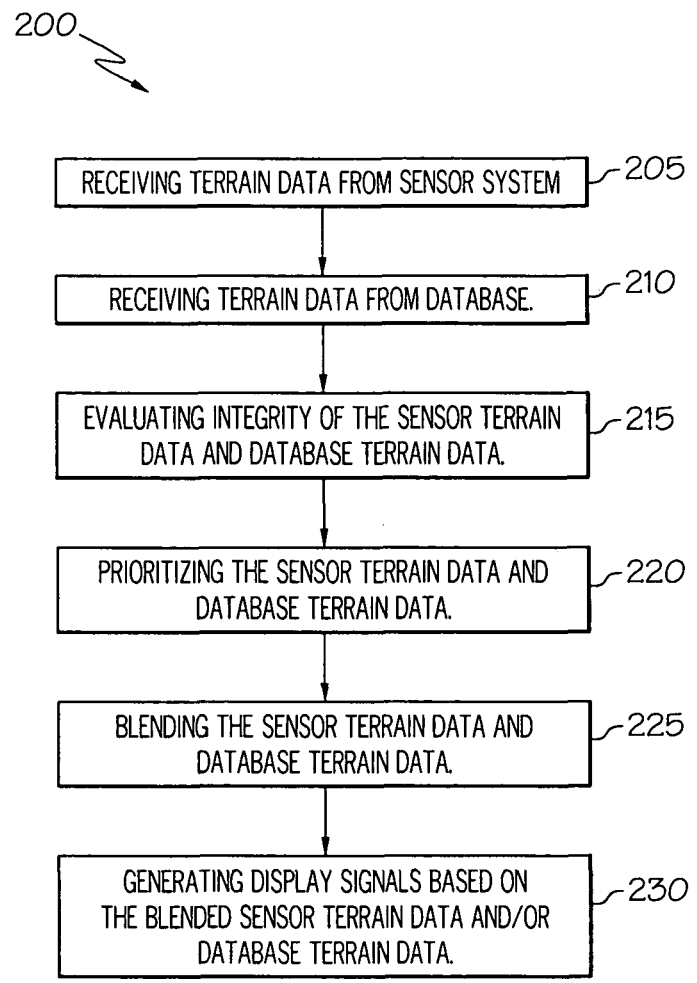
FIG. 2 is a flowchart describing a method for displaying images representing integrated database and sensor data in accordance with an exemplary embodiment.

FIG. 2 is a flow chart that depicts a method 200 for displaying integrated sensor terrain data and database terrain data. In one embodiment, the method 200 is used for displaying terrain data in 3D, synthetic view for a Primary Flight Display of an aircraft, such as for example, the system 100 discussed above. As such, the method 200 of FIG. 2 will be described with reference to FIG. 1.

In a first step 205, the processing unit 102 receives sensor data related to the man-made and natural terrain surrounding the aircraft from sensor system 110. In a second step 210, the processing unit 102 receives database data related to the man-made and natural terrain surrounding the aircraft from database 104.

In a third step 215, the processing unit 102 evaluates the integrity of the sensor data and database data. The integrity can be based on a number of factors, including the health status and functionality of the sensor system 110 and/or database 104. Other factors include the completeness of the data and the resolution of the data. Built In Test (BIT) requirements, for example, may be used to determine data integrity. If terrain sensors are degraded due to various reasons, database data may have higher integrity for the areas in which the two data sources overlap. The processing unit 102 will select higher integrity data source for the display. Among factors may can causes sensor integrity degradation are signal to noise performance degradation, the presence of significant interferences, or mounting fixture malfunctions.

In a fourth step 220, the processing unit 102 prioritizes the sensor data and database data based on the evaluation in step 215. The processing unit 102 will generally have a set of rules to determine the priority of the data to be displayed. For example, if the sensor data is evaluated to meet a predetermined threshold of integrity, the sensor data is prioritized over the database data. Typically, the sensor data is more accurate than the database data because it may be more up-to-date. Additionally, the prioritization may be based on a location of interest. If a location is particularly important to a pilot and the integrity evaluation for both the sensor data and database data are relatively close, the processing unit 102 will generally choose the sensor data to be displayed in the location of interest. As noted above, the sensor data is typically more up-to-date and accurate. Additional considerations for prioritization may include the mobility of the subject of the data. In one embodiment, terrain data retrieved from the sensor system 110 can include moveable terrain, such as buildings, and mobile structures and systems. Sensor data is more suitable for this type of terrain data. As another example, data related to waterbody information and geopolitical boundaries can be designated to come from database 104. In some instances, certain objects may be detected by the sensor system 100, but the object may be known from the database 104. In these cases, it may save processing resources to use data from the database 104.

In a fifth step 225, the processing unit 102 blends the sensor data and database data based on the evaluation and prioritization steps 215-220. In this step, the processing unit 102 will also evaluate the blended data to ensure that a continuous synthetic view can be achieved. If there are gaps or "holes" in the field of view, the processing unit 102 may interpolate between known data points to provide a continuous view. The interpolation of the sensor data may be performed by choosing the average values of the sensor data around the gap area or interpolate with certain smooth functions such as linear relations. This is to assume that the data around that area should not exhibit significant variations since large variations can be generally detected.

Figure 3:
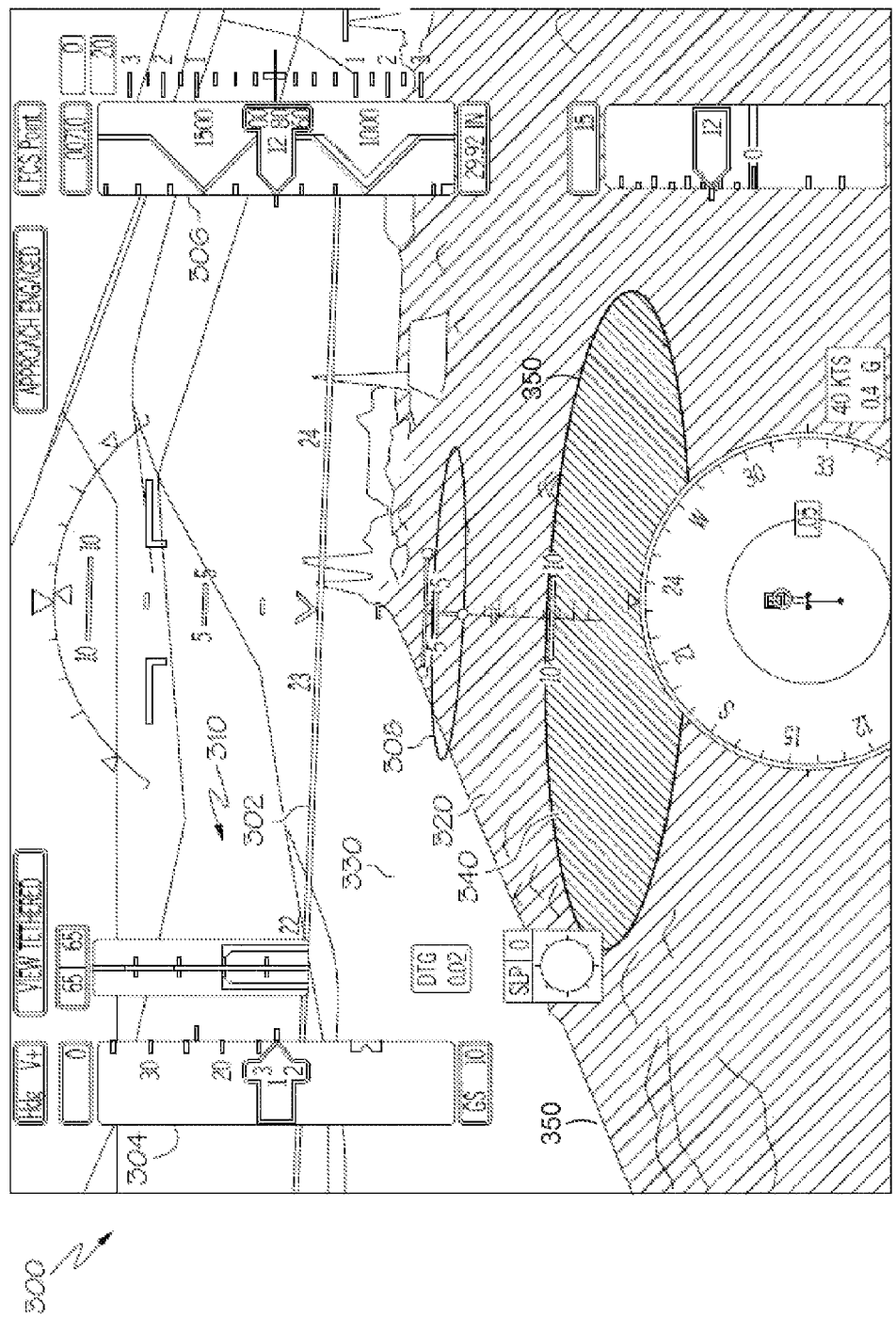
FIG. 3 depicts an exemplary image that may be rendered by the aircraft display system of FIG. 1.

In a sixth step 230, the processing unit 102 generates display signals based on the sensor data and/or database data and provides the display signals to the display device 108. An exemplary visual display 300 is shown in FIG. 3. The visual display 300 is an exemplary visual display that may be rendered, for example, by the aircraft display system 100 of FIG. 1.

The visual display 300 shows, among other things, computer generated symbols representing a zero pitch reference line (e.g., commonly referred to as a horizon line) 302, an airspeed scale or tape 304, an altitude scale or tape 306, a landing point 308, and terrain (e.g., identified generally as element 310). Although the visual display 300 is shown as an egocentric, first-person frame of reference, the visual display 300 can be a secondary, wingman, and/or plan or perspective view that enables a viewer to view the aircraft, as well as zoom in and out, including an unmanned vehicle and/or spacecraft. Although the visual display 300 is generally associated with a Primary Flight Display, the display can also be utilized on a multi-function display, Head Up Display, and/or a head mounted display.

In this embodiment, the terrain 310 is rendered as a three-dimensional, perspective view. The terrain 310 can include any representation of the environment surrounding the aircraft, including flattened terrain. Additionally, the terrain 310 can include a virtual plane selected by a pilot at certain elevation relative to the aircraft and is rendered at that elevation.

In addition, and as will now be described in more detail, the visual display 300 may selectively render symbology forming part of the terrain 310 that represents terrain data from the sensor system 110 and terrain data from the database 104. One exemplary process 200 is described above in reference to FIG. 2 to illustrate how the terrain data from the sensor system 110 and the terrain data from the database 104 are blended and displayed. In one exemplary embodiment, the visual display 300 indicates the particular source of the terrain data to the flight crew. For example, first portions 320 of terrain 310 are rendered in a first, darker color, and second portions 330 of terrain 310 are rendered in a second, lighter color. The first portions 320 represent terrain 310 based on terrain data from the sensor system 110, and the second portions 330 represent terrain 310 based on terrain data from the database 104. As such, the different colors provide the flight crew an easily identifiable indication of the source of terrain data. In further embodiments, the first and second portions 320, 330 may be the same color, but have different textures, appearances, attributes or other types of differentiating indications.

A third portion 340 is rendered in a third, even darker color. The third portion 340 can represent data that has been interpolated from the surrounding data, which in this case, is data from the sensor system 110. A boundary 350 can be additionally provided to more clearly delineate between the first, second and third portions 320, 330, 340.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
   a sensor system configured to collect first terrain data;
   a database configured to store second terrain data;
   a processing unit coupled to the sensor system and database, the processing unit configured to receive the first and second terrain data, to integrate the first and second terrain data into a common three-dimensional view that comprises symbology representing both the first and second terrain data, and to supply display commands associated with the first and second terrain data; and
   a display device coupled the processing unit and configured to receive the display commands and operable to render the common three-dimensional view to thereby allow simultaneous viewing of the first and second terrain data, wherein the display device is configured to display a boundary between the first and second terrain data.

2. The display system of claim 1, wherein the first terrain data is rendered in a first color and the second terrain data is rendered in a second color.

3. The display system of claim 1, wherein the processing unit prioritizes the first and second terrain data relative to each other.

4. The display system of claim 3, wherein the prioritization is based on an evaluation of integrity.

5. The display system of claim 1, wherein the first terrain data has a higher priority than the second terrain data.

6. The display system of claim 1, wherein the first terrain data is rendered with a first texture and the second terrain data is rendered with a second texture.

7. The display system of claim 1, wherein the processing unit is configured to receive an area of interest, and the display device is configured to render the area of interest based on the first terrain data.

8. The display system of claim 1, wherein the processing unit interpolates any gaps in the first terrain data.

9. The display system of claim 1, wherein the processing unit interpolates any gaps in the second terrain data.

10. The display system of claim 1, wherein the display device is a Primary Flight Display (PFD).

11. A method for displaying first terrain data from a sensor system and second terrain data from a database, the method comprising:
    receiving the first terrain data from the sensor system;
    receiving the second terrain data from the database;
    evaluating an integrity of the first and second terrain data;
    prioritizing the first and second terrain data based on the integrity evaluation to create a prioritized result;
    blending the first and second terrain data based on the prioritized result to create blended first and second terrain data;
    producing display signals based on the blended first and second terrain data; and
    rendering a boundary between the first and second terrain data.

12. The method of claim 11, wherein the prioritizing step includes prioritizing a first portion of the first terrain data over a first portion of the second terrain data when the integrity of the first portion of the first terrain data is approximately equal to the integrity of the first portion of the second terrain data.

13. The method of claim 11, wherein the blending step includes blending the first and second terrain data into a continuous, 3D perspective view.

14. The method of claim 13, wherein the blending step includes interpolating any gaps in the first and second data.

15. The method of claim 11, further comprising rendering the first terrain data in a first color and the second terrain data in a second color.

16. The method of claim 11, further comprising rendering the first terrain data with a first appearance and the second terrain data with a second appearance.

17. The method of claim 11, wherein the prioritization step include prioritizing an area of interest with a higher priority.

18. A Primary Flight Display system for an aircraft, comprising:
    a sensor system configured to collect first terrain data;
    a database configured to store second terrain data;
    a processing unit coupled to the sensor system and database, the processing unit configured to receive, blend, evaluate, and prioritize the first and second terrain data into a common three-dimensional view that comprises symbology representing both the first and second terrain data, and to supply display commands associated with the first and second terrain data; and
    a display device coupled the processing unit and configured to receive the display commands and operable to render the common three-dimensional view to thereby allow simultaneous viewing of the first and second terrain data, including symbology representing the first terrain data in a first color and the second terrain data in a second color and a boundary between the first and second terrain data.

\* \* \* \* \*